United States Patent Office 3,331,735
Patented July 18, 1967

3,331,735
HALOGENATED AROMATIC PESTICIDAL COMPOSITIONS FOR CONTROLLING FUNGI, BACTERIA AND NEMATODES
Robert D. Battershell, Painesville, and Henry Bluestone, University Heights, Ohio, assignors to Diamond Alkali Company, Cleveland, Ohio, a corporation of Delaware
No Drawing. Filed Oct. 22, 1965, Ser. No. 502,537
18 Claims. (Cl. 167—30)

This application is a continuation-in-part of application Ser. No. 269,751, filed Apr. 1, 1963, now U.S. Patent 3,290,353, which application is, in turn, a continuation-in-part of Ser. No. 140,261, filed Sept. 25, 1961, now abandoned.

This invention relates to novel pesticidal compositions and to the method for their preparation. More particularly, it relates to pesticidal compositions containing as the pesticidal agent, effective amounts of halogenated aromatic dinitriles, and to the use of such compositions for retarding undesirable biological growth.

The halogenated aromatic dinitriles which are useful in the method of the present invention may be represented by the general formula

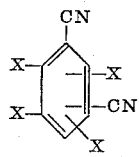

wherein each X is hydrogen or halogen, i.e., chlorine, fluorine, and bromine with at least one X being halogen. These dinitriles are more commonly designated in the art as phthalonitriles, isophthalonitriles and terephthalonitriles. Compounds within this class, which are useful herein include tetrachloroterephthalonitrile, tetrafluoroterephthalonitrile, tetrachloroisophthalonitrile, difluorodichloroterephthalonitrile, 5 - chloro-2,4,6 - trifluoroisophthalonitrile, 2,3-dichloroterephthalonitrile, chlorotrifluoroterephthalonitrile, tetrafluoroterephthalonitrile, 4,6-dichloroisophthalonitrile, 2,5-dichloroterephthalonitrile, 2-chloroterephthalonitrile, 2-fluoroterephthalonitrile, tetrachlorophthalonitrile, 2-bromoterephthalonitrile, 2 - chloro - 3 - fluoroterephthalonitrile, 2,3-difluoroterephthalonitrile, 2-chloro-5-fluoroterephthalonitrile, 2,5 - difluorotetraphthalonitrile, 2,5 - dibromoterephthalonitrile, 2,3,5 - trichloroterephthalonitrile, dichlorodifluoroisophthalonitrile, trichlorofluoroisophthalonitrile, 4,6-difluoroisophthalonitrile, 4 - bromoisophthalonitrile, tetrafluorophthalonitrile, 4-chloroisophthalonitrile, 3,4-dichlorophthalonitrile, chlorotrifluorophthalonitrile, dichlorodifluoropththalonitrile, trifluoroterephthalonitrile, 4-bromo - 6 - fluoroisophthalonitrile, 2-chloroisophthalonitrile, 4-chloroisophthalonitrile, 2,4-dichloroisophthalonitrile, 2-fluoroisophthalonitrile, 4-fluoroisophthalonitrile and 2 - fluoro-4,5,6 - trichloroisophthalonitrile.

The halogenated aromatic dinitriles of this invention generally may be prepared as described in the above referred to copending application Ser. No. 269,751. Typically, such preparations involve conversion of a ring-halogenated, i.e., chlorinated or brominated acid chloride to the corresponding ring-halogenated amide by treatment thereof with ammonia. The halogenated amide compound obtained is then dehydrated to give the desired chlorinated or brominated dinitrile. Alternatively, tetrahalogenated aromatic dinitriles may be prepared in good yield from the corresponding isomers by ammoxidizing the xylene to the dinitrile isomer, followed by vapor phase, catalytic chlorination thereof. Additionally, it is also possible to prepare compounds of this invention by amidation of the corresponding halogenated dicarboxylic acid. The diamide obtained is then dehydrated to the desired halogenated dinitrile. The fluorinated dinitriles generally may be prepared from the chlorinated dinitriles by a halogen interchange whereby chlorine is replaced by fluorine. Typically, the chlorinated compound is reacted with an alkali metal fluoride, e.g., potassium fluoride.

Exhibiting outstanding biological activity, the halogenated aromatic dinitriles of this invention are particularly useful as fungicides, bactericides and nematocides. In the practice of this invention, the halogenated aromatic dinitriles may be applied in undiluted form to the plant or other material to be protected. It is frequently desirable, however, to apply them in admixture with either solid or liquid inert, pesticidal adjuvants. Thus, these compounds can be applied to the plants for fungicidal purposes, for example, by spraying them with aqueous or organic solvent dispersions of these chemicals. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene; ketones such as acetone, methyl ethyl ketone and cyclohexanone; chlorinated hydrocarbons, such as chloroform; and esters such as ethyl acetate, amyl acetate and butyl acetate.

The halogenated aromatic dinitrile compounds can also be applied to plants and other materials along with inert solid fungicidal adjuvants or carriers such as talc, pyrophyllite, Attaclay, kieselguhr, chalk, diatomaceous earth, lime, calcium carbonate, bentonite, fuller's earth, cottonseed hulls, wheat flour, soybean flour, etc., pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benzene sulfonates having 14 to 18 carbon atoms, alkylphenolethylene oxides, e.g., p-isooctyl phenol condensed with 10 ethylene oxide units; and soaps, e.g., sodium stearate and sodium oleate. A typical surface active agent is Aerosol OS (sodium salt of propylated naphthylenesulfonic acid).

The solid and liquid formulations can be prepared in any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5 to 50% of the total by weight. However, concentrations outside this range are operative and compositions containing from 1 to 99% of active ingredient by weight are contemplated, the remainder being carrier and/or any other additive or adjuvant material which may be desired. It is often advantageous to add small percentages of surface active agents, e.g., 0.5 to 1% of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or nonaqueous medium. Desirably, 0.5 to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

It is also advantageous, in some instances, to employ the halogenated aromatic dinitriles in compositions containing other pesticides, more especially fungicides and bactericides.

In order that those skilled in the art may more completely understand the present invention and the preferred methods by which the same may be carried into effect, the following specific examples are offered.

*Example 1.—Inhibition of sclerotial germination*

The following test measures the ability of compounds of this invention to inhibit mycelial growth in soil. Pasteurized soil is infested with *S. rolfsii*, grown on a mixture of corn meal and sand contained in 16-oz. jars. The desired inoculum level is achieved by adding a number of jars of the corn meal-sand culture to a level flat of soil. The inoculum and soil are then intimately mixed and placed in suitable containers. Treatment of the soil is accomplished by drenching an appropriate amount of a diluted formulation containing the test compound, acetone, stock emulsifier solution and distilled water on the surface of the soil in the test container. The concentration of toxicant in this formulation is up to 2000 parts per million. Lower concentrations of toxicant are obtained by diluting the formulation with distilled water. For example, 19.9 ml. of a 1000 p.p.m. formulation, drenched on soil in a 4-oz. squat Dixie cup is equivalent to a dosage of 48 pounds per acre.

After drenching the containers are placed in a high humidity chamber at 70° F. for 48 hours. By this time the fungus mycelium has completely overgrown the surface of the soil in the control containers. Inhibition of mycelial growth is estimated on a scale from zero, complete inhibition of growth, to ten which is equivalent to controls. These grades are expressed as percent control. Using this procedure, the following results are obtained:

| Compound Tested | Concentration, lbs./acre | Percent Control |
|---|---|---|
| Chlorotrifluoroterephthalonitrile | 64 | 100 |
| 5-chloro-2,4,6-trifluoroisophthalonitrile | 64 | 100 |
| Dichlorodifluoroterephthalonitrile | 64 | 100 |
| Tetrafluoroterephthalonitrile | 64 | 100 |
| 2-chloro-3-fluoroterephthalonitrile | 48 | 100 |
| Dichlorodifluoroisophthalonitrile | 48 | 100 |
| 4,6-difluoroisophthalonitrile | 48 | 100 |
| Tetrafluorophthalonitrile | 48 | 100 |
| 4-chlorophthalonitrile | 24 | 100 |
| 3,4-dichlorophthalonitrile | 48 | 100 |
| Chlorotrifluorophthalonitrile | 48 | 100 |
| Dichlorodifluorophthalonitrile | 48 | 100 |
| Trifluoroterephthalonitrile | 48 | 100 |
| 4-bromo-6-fluoroisophthalonitrile | 48 | 100 |
| 4-bromoisophthalonitrile | 48 | 95 |
| 2,4-dichloroisophthalonitrile | 48 | 98 |

*Example 2.—Spore inhibition test on glass slides*

Inhibition of spore germination on glass slides by the test tube dilution method is adopted from the procedure recommended by the American Phytopathological Society's Committee on Standardization of Fungicidal Tests. In this screen, chemicals at 1000, 100, 10 and 1.0 p.p.m. are tested for ability to inhibit germination of spores from 7- and 10-day-old cultures of *Alternaria oleracea* Mil. and *Monilinia fructicola* (Wint.) Honey. These concentrations refer to the actual concentrations after diluting the test preparations with spore stimulant and spore suspension. A formulation containing 0.1 g. of the test compound, 4 ml. acetone, 2 ml. stock emulsifier solution (0.5% Triton X-155 in water by volume) and 74 ml. distilled water is used for this test. The concentration of toxicant in this formulation is 1250 parts per million. The concentrations given above are diluted from this original formulation. Germination records are taken after 20 hours of incubation at 22° C. by observing several microscope fields so that at least 100 spores of each fungus have been examined at each concentration. Test compounds are given alphabetical ratings which correspond to the concentration that inhibits germination of half the spores (ED50) in the test drops: AAA=0.01 to 0.1 p.p.m.; AA=0.1 to 1.0 p.p.m.; A=1.0 to 10 p.p.m.; B=10 to 100 p.p.m; C=100 to 1000 p.p.m.; and D=1000 p.p.m. Using this procedure, the following results were obtained:

| Compound tested: | Rating |
|---|---|
| Chlorotrifluoroterephthalonitrile | AA |
| Dichlorodifluoroterephthalonitrile | AA |
| Tetrachloroisophthalonitrile | AA |
| 5-chloro-2,4,6-tetrafluoroisophthalonitrile | AA |
| Tetrachlorophthalonitrile | AA |
| Dichlorodifluoroisophthalonitrile | AA |
| Trichlorofluoroisophthalonitrile | AA |
| 4,6-difluoroisophthalonitrile | AA |
| Tetrafluorophthalonitrile | AA |
| Chlorotrifluorophthalonitrile | AA |
| Trifluoroterephthalonitrile | AA |

*Example 3*

The tomato foliage disease test measures the ability of the test compound to protect tomato foliage against infection by the early blight fungus *Alternaria solani* (Ell. and Mart.) Jones and grout and the late blight fungus *Phytophthora infestans* (Mont.) deBary. The method used employs tomato plants, 5 to 7 inches high which are 4 to 6 weeks old. Duplicate plants, one set for each test fungus, are sprayed with various dosages of the test formulation at 40 lbs./sq. in. air pressure while being rotated on a turntable in a hood. The center of the turntable is 45 inches from the nozzle of the spray gun. The test formulation containing the test compound, acetone, stock emulsifier solution and distilled water is applied at concentrations up to 2000 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation less toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for later blight to permit spore germination and infection before removal to the greenhouse.

After two days from the start of the test for early blight and three days for late blight, lesion counts are made on the three uppermost fully expanded leaves. The data are converted to percent disease control based on the number of lesions obtained on the control plants. Dosages and percent disease control are given in the following table:

| Compound | Dosage, p.p.m. | Percent Control | |
|---|---|---|---|
| | | E. Blight | L. Blight |
| Tetrachloroisophthalonitrile | 60 | 100 | 100 |
| | 40 | 98 | 99 |
| | 30 | 92 | 99 |
| | 20 | 72 | 94 |
| | 10 | 0 | 70 |
| | 5 | 0 | 8 |
| 5-chloro-2,4,6-trifluoroterephthalonitrile | 1,000 | 82 | 98 |
| | 256 | 37 | 46 |
| Tetrachlorophthalonitrile | 256 | 100 | 100 |
| | 128 | 99 | 100 |
| | 64 | 99 | 100 |
| | 32 | 98 | 63 |
| | 16 | 45 | 40 |
| | 8 | 8 | 23 |
| 2-bromoterephthalonitrile | 1,000 | 91 | 68 |
| | 256 | 84 | 56 |
| | 128 | 72 | 0 |
| 2,3,5-trichloroterephthalonitrile | 1,000 | 90 | 89 |
| | 256 | 78 | 54 |
| | 128 | 72 | 0 |
| Trichlorofluoroisophthalonitrile | 1,000 | 100 | 100 |
| | 256 | 100 | 96 |
| | 64 | 100 | ----------- |
| | 32 | 100 | ----------- |
| | 16 | 95 | ----------- |
| | 4 | 66 | ----------- |

*Example 4.—Seed decay and damping-off pea test*

Soil known to be infested with seed decay and damping-off fungi is placed in plastic pots, 3¾-inches square at top, 2¹¹⁄₁₆-inches square at base, 3¼-inches high and treatment is accomplished by drenching the soil with the appropriate amount of a basic formulation containing 0.4 gram of the test compound, 8 ml. acetone, 4 ml. stock emulsifier solution (0.5% Triton X–155 by volume) and 187.6 ml. distilled water. Employing the plastic pots, 0.79 mg. of the chemical corresponds to 1 pound per acre. One day after treatment, soil is removed from each pot and thoroughly mixed in a five-pound paper bag and then replaced in the pot. Three days after drenching, 25 pea seeds, var. Perfection, are planted in each pot. From the time of treatment until the pea seeds begin to emerge, the pots are held at 20° C. in a controlled temperature cabinet. Untreated checks and a standard material are included in each test in addition to a check planted in sterilized soil. After seed emergence, the pot is removed to the greenhouse bench and percentage stand is recorded 14 days after planting. A stand of 100 percent and 28 percent is observed after 14 days at dosages of 32 and 16 pounds per acre, respectively, of tetrafluoroterephthalonitrile.

*Example 5.—Seed decay and damping-off pea test*

This test is used to determine activity against seed decay and damping-off fungi, primarily Pythium sp. and *Rhizoctonia solani.*

Soil known to be infested with seed decay and damping-off fungi is placed in 4" x 4" x 3" plant band boxes and treatment is accomplished by drenching the soil with 37.2 ml. of the test formulation, which is equivalent to 64 pounds per acre. This test formulation contains 0.4 g. of test compound, 8 ml. acetone, 4 ml. stock emulsifier solution (0.5% Triton X–155 in water by volume) and 187.6 ml. distilled water. The concentration of toxicant in this formulation is 2000 parts per million. Lower concentrations of toxicant are obtained by diluting the formulation with distilled water. The plant band boxes have a surface area of 16 square inches and 1.16 mg. equals 1 pound per acre. One day after treatment, soil is removed from each box and thoroughly mixed in a five-pound paper bag and then replaced in the box. Three days after drenching, 25 pea seeds, var. Perfection, are planted in each box. From the time of treatment until the pea seeds begin to emerge, the boxes are held at 20° C. in a controlled temperature cabinet. Untreated checks and a standard material are included in each test in addition to a check planted in sterilized soil. After seed emergence, the box is removed to the greenhouse bench and percentage stand is recorded 14 days after planting. The percentage stand is then expressed as percent control. Using this procedure, the following results are obtained:

| Compound | Concentration, lbs./acre | Percent Control |
|---|---|---|
| Tetrachloroterephthalonitrile | 64 | 12 |

*Example 6.—Soil mycelial growth inhibition test*

This test is used to determine activity against seed decay and damping-off fungi, primarily Pythium and Rhizoctonia species.

Sterilized soil is infested with Pythium and Rhizoctonia and subsamples placed into a series of 4-oz. Dixie cups. An appropriate amount of the test formulation is drenched onto the soil at a dosage of 64 pounds per acre. This test formulation contains 0.4 g. of test compound, 8 ml. acetone, 4 ml. stock emulsifier solution (0.5% Triton X–155 in water by volume) and 187.6 ml. distilled water. The concentration of toxicant in this formulation is 2000 parts per million. Lower concentrations of toxicant are obtained by diluting the formulation with distilled water. The surface area of the soil in the cups is 5.73 sq. in.; therefore, a rate of 1 pound per acre requires 0.414 mg. of chemical per cup. After drenching, the Dixie cups are then incubated for several days at 70° F. in a controlled temperature cabinet. The test chemicals are rated for their ability to inhibit mycelial growth of the organism on the surface of the soil. Untreated checks and a standard material are included in each test in addition to a check planted in sterilized soil. Using this procedure, the following results are obtained:

| Compound | Concentration, lbs./acre | Percent Control |
|---|---|---|
| Chlorotrifluoroterephthalonitrile | 64 | 100 |
| Dichlorodifluoroterephthalonitrile | 64 | 100 |
| 5-chloro-2,4,6-trifluoroisophthalonitrile | 64 | 100 |

*Example 7.—Soil mycelial growth inhibition test*

The following test measures the ability of compounds of this invention to inhibit mycelial growth in soil. A quantity of pasteurized soil is infested with *Rhizoctonia solani* grown on a mixture of corn meal and sand contained in 16-oz. jars. Another quantity of pasteurized soil is infected with Pythium sp., similarly cultured. For testing each organism, the desired inoculum level is achieved by adding a number of jars of the corn meal-sand culture to a level flat of soil. In each instance, the inoculum and soil are then intimately mixed and placed in suitable containers. Treatment of the soil is accomplished by drenching an appropriate amount of a diluted formulation containing the test compound, acetone, stock emulsifier solution and distilled water on the surface of the soil in the test container. The concentration of toxicant in this basic formulation is up to 2000 parts per million. Lower concentrations of toxicant are obtained by diluting the formulation with distilled water. For example, 19.9 ml. of a 1000 p.p.m. formulation, drenched on soil in a 4-oz. squat Dixie cup is equivalent to a dosage of 48 pounds per acre.

After drenching, the containers are placed in a high humidity chamber at 70° F. for 48 hours. By this time each fungus mycelium has completely overgrown the surface of the soil in the control containers. Inhibition of mycelial growth is estimated on a scale from zero, complete inhibition of growth, to ten which is equivalent to controls. These grades are expressed as percent control. Using this procedure, the following results are obtained:

| Compound Tested | Concentration, lbs./acre | Percent R. solani | Control Pythium sp. |
| --- | --- | --- | --- |
| Tetrafluoroterephthalonitrile | 64 | 100 | |
| Chlorotrifluoroterephthalonitrile | 64 | 100 | |
| Dichlorodifluoroterephthalonitrile | 64 | 100 | |
| Tetrachloroisophthalonitrile | 64 | 90 | |
| 5-chloro-2,4,6-trifluoroisophthalonitrile | 64 | 90 | |
| 2-chloro-3-fluoroterephthalonitrile | 48 | 100 | 100 |
| 4-bromo-6-fluoroisophthalonitrile | 48 | 100 | 100 |
| 2,3-difluoroterephthalonitrile | 48 | 100 | 100 |
| Dichlorodifluoroisophthalonitrile | 48 | 100 | 85 |
| Trichlorofluorisophthalonitrile | 48 | 100 | 99 |
| 4,6-difluoroisophthalonitrile | 48 | 100 | 100 |
| Tetrafluorophthalonitrile | 48 | 100 | 100 |
| 4-chlorophthalonitrile | 24 | 90 | 95 |
| 3,4-dichlorophthalonitrile | 48 | 100 | 100 |
| Chlorotrifluorophthalonitrile | 48 | 100 | 100 |
| Dichlorodifluorophthalonitrile | 48 | 100 | 100 |
| Trifluoroterephthalonitrile | 48 | 100 | 100 |
| 2,4-dichloroisophthalonitrile | 48 | 90 | 90 |
| 2-chloro-5-fluoroterephthalonitrile | 48 | 40 | 98 |

*Example 8.—Tests against four species of bacteria*

Test formulations are examined for ability to inhibit the growth of four bacterial species *Erwinia amylovora* (E.a.), *Xanthomonas phaseoli* (X.p.), *Micrococcus pyrogenes* var. *aureus* (M.a.) and *Escherechia coli* (E.c.) at various concentrations, using sterile broth as the culture medium. The basic test formulation contains 0.1 g. of the test chemical, 4 ml. acetone, 2 ml. stock emulsifier solution (0.5% Triton X–155 in water by volume) and 74 ml. distilled water, the concentration of toxicant in this formulation being 1250 parts per million. Lower concentrations of toxicant are obtained by diluting the basic formulation with distilled water. All of the bacterial species are cultured on nutrient agar slants except *X. phaseoli* which is grown on potato dextrose agar.

The cultures used for testing are subcultured for two sequential 24-hour periods to insure uniform test populations. Bacterial suspensions are made from the second sub-culture in the culture tube by addition of distilled water and gentle agitation, after which they are filtered through double layers of cheesecloth and adjusted to standard concentrations by turbidimetric measurement. Each of four test tubes arranged in a rack receive one ml. of the 1250 p.p.m. test formulation. After the test formulations have been measured into a test tube, 3½ ml. of distilled water and ½ ml. of bacterial suspension for each respective test organism is added to each test tube. The medication tubes are then set aside at room temperature for four hours. After this exposure period, transfers are made by means of a standard 4 mm. platinum loop to 7 ml. of sterile broth. The broth tubes are then incubated for 48 hours at 29° to 31° C., at which time bacterial growth is determined by turbidimetric measurement. A reading is recorded for each test tube after shaking. Three replicates of each organism serve as controls. Comparative growth calculations are made on the percent of the mean check reading. This value, subtracted from 100, gives percent control as compared to checks. Using this procedure, the following results are obtained:

| Compound | Concentration (p.p.m.) | Percent Control | | | |
| --- | --- | --- | --- | --- | --- |
| | | E.a. | X.p. | M.a. | E.c. |
| Tetrafluoroterephthalonitrile | 250 | 100 | 20 | 20 | 20 |
| Chlorotrifluoroterephthalonitrile | 250 | 100 | 100 | 100 | 12 |
| | 100 | 100 | 38 | 11 | 19 |
| Dichlorodifluoroterephthalonitrile | 250 | 100 | 100 | 10 | 0 |
| | 100 | 100 | 100 | 0 | 0 |
| | 64 | 100 | 100 | 0 | 0 |
| 5-chloro-2,4,6-trifluoroisophthalonitrile | 250 | 100 | 100 | 100 | 100 |
| | 100 | 100 | 100 | 100 | 100 |
| | 16 | 100 | 100 | 0 | 100 |
| | 8 | 100 | 100 | 0 | 100 |
| | 4 | 100 | 100 | 0 | 0 |
| | 2 | 100 | 100 | 0 | 0 |
| | 1 | 100 | 0 | 0 | 0 |

*Example 9.—Tests against four species of bacteria*

Test formulations are examined for ability to inhibit the colonial growth of *Erwinia amylovora* (E.a.), *Xanthomonas phaseoli* (X.p.), *Staphylococcus aureus* (S.a.) and *Escherechia coli* (E.c.) at various concentrations, using nutrient agar as the culture medium. The basic test formulation contains 0.1 g. of the test chemical, 4 ml. acetone, 2 ml. stock emulsifier solution (0.5% Triton X–155 in water by volume) and 74 ml. distilled water, the concentration of toxicant in this formulation being 1250 parts per million.

For each chemical, a quantity of this basic formulation is dispensed into a test tube which is then placed into a water bath maintained at 44° C. From a stock preparation (also held at 44° C.), a sufficient quantity of a 20-percent nutrient agar is added to the test tube to give the concentration of test chemical desired. For example, 2 ml. of the basic formulation mixed with 8 ml. of the agar gives a final concentration of 250 p.p.m. chemical in the agar. The contents of the test tube are then thoroughly mixed, while still warm, with the aid of a vortex type mixer and immediately poured into a sterile polystyrene Petri dish (100 x 15 mm.). After the agar in the plate has set, suspensions of each organism are simultaneously streaked onto the surface of the agar. After the plate is inoculated, it is incubated 24 to 48 hours at 30° C., after which time growth of each organism is noted. To test the chemical at the lower concentrations, the basic formulation is diluted with distilled water prior to its mixture with the agar. Using this procedure, results are as follows:

| Compound Tested | Concentration (p.p.m.) | Percent Control | | | |
| --- | --- | --- | --- | --- | --- |
| | | E.a. | X.p. | M.a. | E.c. |
| 2-Chloro-3-fluoroterephthalonitrile | 300 | 100 | 100 | 0 | 0 |
| | 100 | 50 | 100 | 0 | 0 |
| | 30 | 0 | 100 | 0 | 0 |
| 2,3-Difluoroterephthalonitrile | 300 | 100 | 100 | 0 | 0 |
| | 100 | 100 | 100 | 0 | 0 |
| | 30 | 50 | 0 | 0 | 0 |
| Dichlorodifluoroisophthalonitrile | 300 | 100 | 100 | 100 | 100 |
| | 100 | 100 | 100 | 0 | 100 |
| | 30 | 50 | 50 | 0 | 0 |
| Trichlorofluoroisophthalonitrile | 300 | 100 | 100 | 0 | 100 |
| | 64 | 100 | 100 | 0 | 0 |
| | 32 | 50 | 50 | 0 | 0 |
| | 16 | 0 | 50 | 0 | 0 |
| Chlorotrifluorophthalonitrile | 64 | 100 | 100 | 100 | 100 |
| | 32 | 100 | 100 | 50 | 50 |
| | 16 | 100 | 100 | | |
| | 8 | 100 | 100 | | |
| Dichlorodifluorophthalonitrile | 128 | 100 | 100 | 100 | 100 |
| | 64 | 100 | 100 | 50 | 50 |
| | 32 | 100 | 100 | 0 | 0 |
| Trifluoroterephthalonitrile | 128 | 100 | 100 | 50 | 50 |
| | 64 | 100 | 100 | 0 | 0 |
| 2-Fluoro-4,5,6-trichloroisophthalonitrile | 32 | 100 | 100 | 100 | 0 |
| | 16 | 100 | 100 | 100 | 0 |
| | 8 | 0 | 100 | 0 | 0 |

Example 10.—Root-knot nematodes

This test is an evaluation of the effectiveness of the compounds of this invention against root-knot nematodes (Meloidogyne sp.).

Composted greenhouse soil, diluted with clean washed sand, is placed in a suitable container and infested with knotted or galled tomato roots. Treatment is accomplished by mixing the test formulation intimately with the soil if a solid, or by drenching, if a liquid, paste, or of gummy consistency. The formulation contains the test chemical, acetone, stock emulsifier and distilled water and is applied at a concentration equal to 256 pounds of test chemical per acre or less.

After treatment, all containers are stored at 20° C. where they are covered with plastic to maintain moisture. Seven days after treatment the soil in each container is thoroughly mixed, returned to the container and three seedling tomatoes are transplanted therein. After three weeks in the greenhouse the plants are carefully removed from the soil and roots are inspected for nematode galls. A rating of infection from 0 to 10 is recorded: 0=no galls or complete control and 10=heavily galled roots comparable to controls. Each of the three root systems is rated separately and the average is multiplied by 10 and subtracted from 100 to give percent nematode control. Phytotoxicity results are also reported. In addition to the infested controls, usually three pots of similar non-infested controls are included in the test. Results of the test are as follows:

| Compound | Concentration, lbs./acre | Percent Control Root-knot Nematodes |
| --- | --- | --- |
| Tetrafluoroterephthalonitrile | 128 | 90. |
|  | 64 | 90 Ph 1. |
| Dichlorodifluoroterephthalonitrile | 128 | 100 Sc. |
|  | 128 | 97. |
| 2,3-difluoroterephthalonitrile | 64 | 93. |
|  | 32 | 50. |
| 2-fluoroterephthalonitrile | 128 | 100 St 1. |
|  | 32 | 80. |
| 2,5-difluoroterephthalonitrile | 128 | 100 St 4. |
|  | 64 | 60. |
| 4-fluoroisophthalonitrile | 128 | 100. |
| 4-bromoisophthalonitrile | 128 | 90. |

Ph=Phytotoxicity rating, 0 for no injury to 11 for killing the plants. Sc=Stem collapse. St=Stunting (1 slight to 9 severe).

Example 11.—Cucumber anthracnose

This test measures the ability of the test compound to control anthracnose of cucumber incited by the fungus *Colletotrichum lagenarium*.

The method used is a modification of that described by McCallan and Wellman and employs cucumber plants, (var. National Pickling) having one fully expanded leaf. Duplicate plants are sprayed with various dosages of the test formulation at 20 lbs./sq. in. air pressure while being rotated on a turntable in a hood. The center of the turntable is 45 inches from the nozzle of the spray gun. The test formulation containing 0.2 g. of test compound, 8 ml. acetone, 4 ml. stock emulsifier solution (0.5% Triton X–155 in water by volume) and 187.6 ml. distilled water is applied at dosages equivalent to 1000 and 200 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation without toxicant) are sprayed while being rotated on a turntable with a spore suspension containing approximately 400,000 spores per ml. of *Colletotrichum lagenarium*. The atomizer used delivers 20 ml. in the 30-second exposure period. The plants are held in a saturated atmosphere for 24 hours at 70° F. to permit spore germination and infection before removal to the greenhouse.

After four to six days from the start of the test, lesion counts are made. The data are converted to percentage disease control based on the number of lesions obtained on the control plants. Dosages and percent disease control are given in the following table:

| Compound | Dosage, p.p.m. | Percent Disease Control |
| --- | --- | --- |
| Tetrachloroisophthalonitrile | 64 | 100 |
|  | 32 | 99 |
|  | 16 | 95 |
|  | 8 | 80 |
|  | 4 | 68 |

Example 12.—Control of apple scab

The apple scab disease test measures the ability of the test compound to protect apple seedlings against infection by the fungus *Venturia inaequalis*.

The method used is a modification of that described by McCallan and Wellman and employs McIntosh apple seedlings, 5 to 8 weeks old with 4 to 6 leaves. Duplicate seedlings are sprayed with various dosages of the test formulation at 40 lbs./sq. in. air pressure while being rotated on a turntable in a hood. The center of the turntable is 45 inches from the nozzle of the spray gun. The test formulation containing 0.2 g. of test compound, 8 ml. acetone, 4 ml. stock emulsifier solution (0.5% Triton X–155 in water by volume) and 187.6 ml. distilled water is applied at dosages equivalent to 1000 and 200 p.p.m. of the test chemical. Lower concentrations of toxicant are obtained by employing less toxicant and more water, thereby maintaining the same concentration of acetone and emulsifier.

After the spray deposit is dry, treated seedlings and controls (sprayed with formulation without toxicant) are sprayed while being rotated on a turntable with a conidial suspension of the fungus. The atomizer used delivers 20 ml. in the 30-second exposure period. The seedlings are held in a saturated atmosphere for 48 hours at 60° F. to permit spore germination and infection before removal to the greenhouse.

After 10 to 14 days from the start of the test lesion counts are made. The data are converted to percentage disease control based on the number of lesions obtained on the control plants. Dosages and percent disease control are given in the following table:

| Compound | Dosage, p.p.m. | Percent Disease Control |
| --- | --- | --- |
| Tetrachloroisophthalonitrile | 1 | 100 |
|  | 0.5 | 100 |
|  | 0.25 | 100 |
|  | 0.125 | 50 |
| Tetrachlorophthalonitrile | 20 | 100 |
|  | 5 | 72 |

Example 13.—Powdery mildew systemic

This test measures the systemic fungicidal action of compounds of this invention against the powdery mildew, *Erysiphe polygoni*. Bean plants, about four to six inches tall, four per clay pot are treated. In this test a formulation containing the test compound, acetone, stock emulsifier solution and distilled water is poured on the soil surface. A dosage of 42 ml. of the formulation is equivalent to a concentration of active chemical of 42 mg. per pot or 64 pounds per acre. The concentration of toxicant in this formulation is up to 2000 parts per million. Lower concentrations of toxicant are obtained by diluting the formulation with distilled water.

Plants are treated and then exposed to mildew spores from a culture maintained in the greenhouse. It is not necessary to apply the spores to the plants, but spores are carried by air currents from the culture to the treated plants giving a heavy uniform infection on the controls at the end of the holding period. Results are recorded after two weeks by estimating disease control based on check plants. Using this procedure, the following results are obtained:

| Compound Tested | Concentration, lbs./acre | Percent Disease Control |
|---|---|---|
| 4-bromo-6-fluoroisophthalonitrile | 32 | 90 |

Example 14.—Panagrellus test

Nonplant parasitic nematodes (*Panagrellus redivivus*) are exposed to the test chemical in small watch glasses. Three watch glasses are used, two receiving appropriate dosages of a test formulation containing the test compound, acetone, stock emulsifier solution and distilled water, and the third receiving the same dosage of distilled water. After all of the test dishes have been set up in this manner, the Panagrellus suspension is added to each watch glass. After these additions are made, the Petri dishes are closed. The watch glass in the center of each dish, containing only water and nematodes, detects fumigant action. The other two containing chemical and nematodes measure contact activity.

The organism is grown on cooked oatmeal which is sterilized in the autoclave before being centrally inoculated from an old culture. The culture is held at 22° C. and after 10 to 14 days the surface of the oatmeal is swarming with nematodes which are visible to the eye. Such a culture is used to prepare the test suspension. The concentration of the nematodes is adjusted so that each watch glass contains 30 to 40 nematodes. At the end of 48 hours mortality counts are made from which percent kill can be determined. Using this procedure, the following results are obtained:

| Compound | Concentration, p.p.m. | Percent Contact | Mortality Fumigant |
|---|---|---|---|
| Chlorotrifluorophthalonitrile | 300 | 100 | 100 |
|  | 100 | 100 | 100 |
|  | 30 | 100 |  |
|  | 10 | 100 |  |
| Tetrafluorophthalonitrile | 300 | 100 | 100 |
|  | 100 | 100 | 100 |
|  | 30 | 100 |  |
|  | 10 | 93 |  |
| Trifluoroterephthalonitrile | 300 | 100 | 100 |
|  | 100 | 100 | 100 |
|  | 30 | 100 |  |
|  | 10 | 95 |  |
| Dichlorodifluorophthalonitrile | 300 | 100 | 100 |
|  | 100 | 100 | 79 |
|  | 30 | 100 |  |
|  | 10 | 100 |  |
| 2,3-difluoroterephthalonitrile | 300 | 100 | 100 |
|  | 100 | 100 | 0 |
|  | 30 | 100 |  |
|  | 10 | 49 |  |

Example 15.—Protection of peas from Pythium sp. by soil treatment (non-inoculated and inoculated soil)

Air-dry, sterile soil is infested with the organism *Pythium sp.* The soil is placed into 3¼″ x 3¼″ x 2½″ plastic boxes. An appropriate amount of test formulation is poured onto the soil to give the desired rate of application, e.g., 25 ml. of equivalent to a dosage of 64 pounds per acre. This test formulation contains 0.4 g. of test compound, 8 ml. acetone, 4 ml. stock emulsifier solution (0.5% Triton X–155 in water by volume) and 187.6 ml. distilled water. The concentration of toxicant in this formulation is 2000 parts per million. The test formulation is thoroughly incorporated into the soil. An identical box of soil is prepared which has been treated with the test formulation, but has not been inoculated with the organism. The non-inoculated treated control is used to determine the phytotoxicity of each test compound. Twenty-five Perfection peas are planted in the treated soil in each box. Each box receives 50 ml. of water and is placed in a humidity chamber maintained at 70° F. for two days. The boxes are then transferred to the greenhouse. Effectiveness of the test chemical is determined by the percentage of plants growing 14 days after treatment and planting.

| Compound Tested | Concentration, lbs./acre | Percent Stand | |
|---|---|---|---|
|  |  | Non-inoculated | Inoculated |
| Chlorotrifluoroterephthalonitrile | 64 | 48 St 7 | 24 St 6. |
|  | 32 | 100 | 32 St 4, DO. |
|  | 16 | 96 | 20 St 4, DO. |
| Dichlorodifluoroterephthalonitrile | 64 | 96 | 98. |
|  | 32 | 100 | 78 DO. |
|  | 16 | 96 | 78 DO. |

ST=Stunting (1 slight to 9 severe). DO=Damping-Off.

Example 16.—Protection of cucumbers from Rhizoctonia solani by soil treatment (non-inoculated and inoculated soil)

Air-dry, sterlite soil is infested with the organism *Rhizoctonia solani*. The soil is placed into 3¼″ x 3¼″ x 2½″ plastic boxes. An appropriate amount of test formulation is poured onto the soil to give the desired rate of application, e.g., 25 ml. is equivalent to a dosage of 64 pounds per acre. This test formulation contains 0.4 g. of test compound, 8 ml. acetone, 4 ml. stock emulsifier solution (0.5% Triton X–155 in water by volume) and 187.6 ml. distilled water. The concentration of toxicant in this formulation is 2000 parts per million. The test formulation is thoroughly incorporated into the soil. An identical box of soil is prepared which has been treated with the test formulation, but has not been inoculated with the organism. The non-inoculated treated control is used to determine the phytotoxicity of each test compound. Twenty-five National Pickling cucumber seeds are planted in the treated soil in each box. Each box receives 50 ml. of water and is placed in a humidity chamber maintained at 70° F. for 2 days. The boxes are then transferred to the greenhouse. Effectiveness of the test chemical is determined by the percentage of plants growing 14 days after treatment and planting.

| Compound Tested | Concentration, lbs./acre | Percent Stand | |
|---|---|---|---|
|  |  | Non-inoculated | Inoculated |
| Chlorotrifluoroterephthalonitrile | 64 | 20 St 7 | 76 St 6. |
|  | 32 | 76 St 5 | 92. |
|  | 16 | 80 | 80. |
|  | 8 | 40 | 68. |
|  | 4 | 92 | 64. |
| 4,6-difluoroisophthalonitrile | 32 | 8 | 88 St 7. |
|  | 16 | 100 Dm, St 2 | 100 St 2. |
|  | 8 | 100 | 56 St 4, DO. |
|  | 4 | 100 | 4 St 7. |
| Tetrafluorophthalonitrile | 16 | 100 St 4 | 100 St 3. |
|  | 8 | 100 St 3 | 88 St 1, DO. |
|  | 4 | 100 St 2 | 48 St 2, DO. |
|  | 2 | 100 St 1 | 36 St 2, DO. |
| Trichlorofluoroisophthalonitrile | 64 | 100 St 4 | 100 St 4. |
|  | 32 | 100 St 2 | 100 St 2. |
|  | 16 | 100 | 82 DO. |
|  | 8 |  | 32 DO. |
| Dichlorodifluoroterephthalonitrile | 64 | 96 St 4, DM | 92 St 4, Ch. |
|  | 16 |  | 42 St 4. |
|  | 8 |  | 8 St 6. |

ST=Stunting (1 slight to 9 severe). Ch=Chlorosis. Dm=Delayed emergence. DO=Damping-Off.

Example 17.—Protection of cabbage from Sclerotium rolfsii by soil treatment

Air-dry sterile soil is infested with the organism *Sclerotium rolfsii*, grown on a mixture of corn meal and sand. The desired inoculum level is achieved by adding an appropriate amount of the corn meal-sand culture to the soil. The soil is placed into 3¼″ x 3¼″ x 2½″ plastic boxes. An appropriate amount of test formulation is poured onto the soil to give the desired rate of application, e.g., 25 ml. is equivalent to a dosage of 64 pounds per acre. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 parts per million. The test formulation is thoroughly incorporated into the soil. An identical box of soil is prepared which has been treated with the test formulation, but has not been inoculated with the organism. The non-inoculated treated control is used to determine the phytotoxicity of each test compound. Twenty-five cabbage seeds (Golden Acres) are planted in the treated soil in each box. Each box receives 50 ml. of water and is placed in a humidity chamber maintained at 70° F. for 2 days. The boxes are then transferred to the greenhouse. Effectiveness of the test chemical is determined by the percentage of plants growing 14 days after treatment and planting.

| Compound Tested | Concentration, lbs./acre | Percent Stand | |
|---|---|---|---|
| | | Non-inoculated | Inoculated |
| Tetrafluoroterephthalonitrile | 8 | 100 | 68. |
| Chlorotrifluoroterephthalonitrile | 64 | 16 St 7 | 32 St 8. |
| | 32 | 92 St 6, Fe | 60 St 4. |
| | 16 | 72 | 86. |
| Dichlorodifluoroterephthalonitrile | 64 | 60 St 8 | 72. |
| | 32 | 92 St 4 | 76 St 4. |
| | 16 | 100 | 76. |
| | 8 | 100 | 24. |
| Tetrachloroisophthalonitrile | 16 | 100 | 52. |
| 5-chloro-2,4,6-trifluoroisophthalonitrile | 32 | 92 | 68. |
| | 16 | | 36. |
| | 8 | | 10. |

St=Stunting (1 slight to 9 severe). Fe=Formative effects to the plants.

*Example 18.—Protection of peas from Sclerotium rolfsii by soil treatment (non-inoculated and inoculated soil)*

Air dry sterile soil is infested with the organism *Sclerotium rolfsii*. The soil is placed in plastic pots. An appropriate amount of test formulation is poured onto the soil to give the desired rate of application, e.g., 25 ml. is equivalent to a dosage of 64 pounds per acre on a broadcast basis. This test formulation contains the test compound, acetone, stock emulsifier solution and distilled water. The concentration of toxicant in this formulation is 2000 parts per million. The test formulation is thoroughly incorporated into the soil by emptying the contents of the pot into a container and shaking vigorously. A non-inoculated treated control is also run to determine the phytotoxicity of each test compound. Twenty-five Perfection peas are planted in the treated soil in each box. Each box receives 50 ml. of water and is placed in a humidity chamber maintained at 70° F. for 1 day. The boxes are then transferred to the greenhouse. Effectiveness of the test chemical is determined by the percentage of plants growing 16 days after treatment and planting.

| Compound Tested | Concentration, lbs./acre | Percent Stand | |
|---|---|---|---|
| | | Non-inoculated | Inoculated |
| Dichlorodifluorophthalonitrile | 16 | 100 | 100. |
| | 8 | 100 | 100. |
| | 4 | | 66 DO. |
| | 2 | | 18 DO. |
| Tetrafluorophthalonitrile | 8 | 0 St 5 | 0. |
| | 4 | 80 | 80. |
| | 64 | 100 | 100. |
| Trichlorofluoroisophthalonitrile | 32 | 100 | 84 DO. |
| | 16 | | 52 DO. |
| | 8 | | 40 DO. |
| | 4 | | 8 DO. |

DO=Damping-Off. St=Stunting (1 slight to 9 severe).

*Example 19*

This example illustrates the excellent control of fungal diseases in a greenhouse by fumigation with tetrachloroisophthalonitrile which sublimes on heating above 100° C. Thirty tomato plants, variety Bonny Best, are placed randomly throughout a greenhouse having a volume of approximately 3000 cubic feet. One-hundred g. of a wettable powder formulation which contains 75 percent by weight of tetrachloroisophthalonitrile is placed in an open container and sublimed by heating it over a can containing burning sawdust. The concentration of the chemical is approximately 33 mg. per cubic foot. All of the chemical sublimes in about 30 minutes uniformly throughout the greenhouse and onto the foliage of the tomato plants. The dusted plants are left in the greenhouse for 24 hours, then removed to another area where they are inoculated with spores of the early blight fungus. *Alternaria solani*. The inoculated plants are then placed in a humidity chamber for 24 hours at which time they are removed to the greenhouse for observation of disease development. With this procedure, disease control is found to be over 95 percent.

*Example 20*

To further illustrate the effectiveness of tetrachloroisophthalonitrile when used as a fumigant fungicide in greenhouses, a series of tests are carried out, employing varying quantities of the chemical. For each test, several Bonny Best tomato plants and Tendergreen bean plants are randomly placed in an 18 foot x 30 foot greenhouse. Sheets of aluminum foil are laid flat on racks above the greenhouse benches in order to determine the amount of tetrachloroisophthalonitrile surface deposits. The greenhouse is then thermally dusted with the chemical. This is accomplished by mixing a quantity of a wettable powder formulation containing 75 percent by weight of tetrachloroisophthalonitrile with 100 ml. of quartz sand in a sulfur evaporator or vaporizer equipped with a 100-watt bulb as the heat source. The chemical-sand mixture is heated for 15 hours. The dusted tomato plants are then sprayed with a suspension of *Alternaria solani*, placed in a humidity chamber for 24 hours and finally removed to the greenhouse for observation of disease lesion development. The bean plants are infected by interspersing heavily mildewed plants among the treated plants. The degree of early blight disease control is determined by actual lesion count two days after the treated plants are stored; the percentage control of bean mildew is based on an estimation of uninfected leaf surface, made two weeks after start of the test. Using this procedure, the following results are obtained:

| Tetrachloroisophthalonitrile Released, g. | Percent Control of Early Blight on Tomato | Percent Control of Powdery Mildew on Beans | Mg. Chemical Per sq. in. Exposed Al Foil |
|---|---|---|---|
| 7.5 | 100 | 100 | 38.8 |
| 3.75 | 98 | 100 | 7.1 |
| 1.75 | 98 | 50 | 4.7 |

The dusting treatment also affords the same control of the early blight organism even when the dusted tomato plants are subjected to 1.5 inches of simulated rainfall before being inoculated with the organism. In addition to the use of an open container or sulfur vaporizer as described above, other methods for subliming tetrachloroisophthalonitrile may be employed as, for example, by incorporating the chemical in pyrotechnic or smoke bombs or by heating tablets containing essentially tetrachloroisophthalonitrile and a minor proportion, e.g., up to 10% of a binder such as polyvinyl pyrollidone. By the term "sublimation" as used herein is meant the transformation of the solid chemical directly to the vapor phase, without passing through the liquid phase, followed by condensation of the vapors directly to the solid state. It is to be understood, of course, that any means can be used whereby tetrachloroisophthalonitrile can be sublimed uniformly. This chemical can be sublimed at temperatures above 300° C. without decomposition. In "thermal dusting," such as herein described, temperatures ranging from 100° to 350° C. typically are employed. The heating time period may vary from 5 minutes to several hours depending upon the temperature and method of application employed.

It should also be recognized that tetrachloroisophthalonitrile may also be applied effectively contained in a suitable solvent. A particularly efficient method for applying such liquid formulations to the plants to be protected is by thermal dusting, using any of the thermal fogging devices commercially available at present.

It is to be understood that although the invention has been described with specific reference to particular embodiments thereof, it is not to be so limited, since changes and alterations therein may be made which are within the full intended scope of this invention as defined by the appended claims.

What is claimed is:

1. A biologically-active composition comprising from 1 to 99% of a compound having the structure

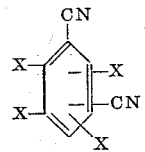

wherein each X is selected from the group consisting of hydrogen, chlorine, fluorine and bromine with at least one X being other than hydrogen; from 0.05 to 1 percent surface-active agent and the balance an inert solid carrier.

2. A fungicidal composition comprising as an essential active ingredient a fungicidal amount of tetrachloroisophthalonitrile, a minor amount of a surface-active agent and the balance a carrier.

3. A fungicidal composition comprising as an essential active ingredient a fungicidal amount of tetrafluoroterephthalonitrile, a minor amount of a surface-active agent and the balance a carrier.

4. A fungicidal composition comprising as an essential active ingredient a fungicidal amount of tetrachlorophthalonitrile, a minor amount of a surface-active agent and the balance a carrier.

5. The method for controlling fungus growth which comprises contacting the said fungus with a fungicidal amount of a compound having the structure

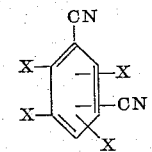

wherein each X is selected from the group consisting of hydrogen, chlorine, fluorine and bromine with at least one X being other than hydrogen.

6. The method of inhibiting fungus growth which comprises applying to the soil a fungicidal amount of a compound selected from the group consisting of chlorotrifluoroterephthalonitrile, dichlorodifluoroterephthalonitrile, 5-chloro-2,4,6-trifluoroisophthalonitrile, tetrafluoroterephthalonitrile, tetrachloroisophthalonitrile, tetrafluorophthalonitrile, chlorotrifluorophthalonitrile, 4-chlorophthalonitrile, 4-bromo-6-fluoroisophthalonitrile, 4,6-difluoroisophthalonitrile, trichlorofluoroisophthalonitrile and dichlorodifluorophthalonitrile.

7. The method of inhibiting fungus growth on plants which comprises applying to the foliage of said plants a fungicidal amount of a compound selected from the group consisting of chlorotrifluoroterephthalonitrile, dichlorodifluoroterephthalonitrile, tetrachloroisophthalonitrile, tetrachlorophthalonitrile, 5-chloro-2,4,6-trifluoroterephthalonitrile, and trichlorofluoroisophthalonitrile.

8. The method of inhibiting fungus growth which comprises applying to the soil a fungicidal amount of tetrafluoroterephthalonitrile.

9. The method of inhibiting fungus growth which comprises contacting the said fungus with a fungicidal amount of tetrafluoroterephthalonitrile.

10. The method of inhibiting fungus growth which comprises contacting the said fungus with a fungicidal amount of tetrachloroisophthalonitrile.

11. The method of inhibiting fungus growth on plants which comprises applying to the foliage of said plants a fungicidal amount of tetrachloroisophthalonitrile.

12. The method of inhibiting fungus growth which comprises contacting the said fungus with a fungicidal amount of tetrachlorophthalonitrile.

13. The method of inhibiting fungus growth on plants which comprises applying to the foliage of said plants a fungicidal amount of tetrachlorophthalonitrile.

14. The method of inhibiting fungus growth on plants which comprises applying to the foliage of said plants a fungicidal amount of trichlorofluoroisophthalonitrile.

15. The method of inhibiting fungus growth on plants which comprises subliming tetrachloroisophthalonitrile onto the foliage of said plants.

16. The method of controlling bacteria which comprises contacting the bacteria with a bactericidal amount of a compound selected from the group consisting of tetrafluoroterephthalonitrile, chlorotrifluoroterephthalonitrile, dichlorodifluoroterephthalonitrile and 5-chloro-2,4,6-trifluoroisophthalonitrile.

17. The method of killing nematodes which comprises applying to the soil a nematocidal amount of a compound selected from the group consisting of tetrafluoroterephthalonitrile, dichlorodifluoroterephthalonitrile, 2,3-difluoroterephthalonitrile, 2-fluoroterephthalonitrile and 4-fluoroisophthalonitrile.

18. The method of killing nematodes which comprises contacting said nematodes with a nematocidal amount of a compound selected from the group consisting of chlorotrifluoroisophthalonitrile, tetrafluorophthalonitrile, trifluoroterephthalonitrile, dichlorodifluorophthalontrile and 2,3-difluoroterephthalonitrile.

No references cited.

LEWIS GOTTS, *Primary Examiner.*

SHEP K. ROSE, *Assistant Examiner.*